(12) United States Patent
Pan et al.

(10) Patent No.: US 12,051,821 B2
(45) Date of Patent: Jul. 30, 2024

(54) BATTERY PACK AND VEHICLE

(71) Applicant: CALB CO., LTD., Jiangsu (CN)

(72) Inventors: Fangfang Pan, Changzhou (CN);
Junshan Guan, Changzhou (CN);
Tinglu Yan, Changzhou (CN); Yongjie Zhang, Luoyang (CN); Qixin Guo, Luoyang (CN)

(73) Assignee: CALB Co., Ltd., Jiangsu (CN)

( * ) Notice: Subject to any disclaimer, the term of this patent is extended or adjusted under 35 U.S.C. 154(b) by 136 days.

(21) Appl. No.: 17/367,587

(22) Filed: Jul. 5, 2021

(65) Prior Publication Data
US 2022/0367965 A1 Nov. 17, 2022

(30) Foreign Application Priority Data

May 14, 2021 (CN) .......................... 202110528542.6

(51) Int. Cl.
*H01M 50/325* (2021.01)
*H01M 50/204* (2021.01)
(Continued)

(52) U.S. Cl.
CPC ....... *H01M 50/325* (2021.01); *H01M 50/204* (2021.01); *H01M 50/296* (2021.01);
(Continued)

(58) Field of Classification Search
CPC ............. H01M 50/325; H01M 50/296; H01M 50/204; H01M 50/668; H01M 2200/20; H01M 2220/20
See application file for complete search history.

(56) References Cited

U.S. PATENT DOCUMENTS

| 2007/0184337 A1* | 8/2007 | Nagayama | H01M 50/24 |
| | | | 429/82 |
| 2011/0236734 A1* | 9/2011 | Ikeda | H01M 50/3425 |
| | | | 137/511 |

(Continued)

FOREIGN PATENT DOCUMENTS

| CN | 209183609 | 7/2019 |
| CN | 210403800 | 4/2020 |

(Continued)

OTHER PUBLICATIONS

"Search Report of Europe Counterpart Application", issued on Apr. 14, 2022, p. 1-p. 11.

(Continued)

*Primary Examiner* — Brian R Ohara
*Assistant Examiner* — Emily Elizabeth Freeman
(74) *Attorney, Agent, or Firm* — JCIP GLOBAL INC.

(57) ABSTRACT

A battery pack includes a bottom plate, a first beam, a frame, and a battery assembly having at least two batteries. A height of the frame is greater than a height of the first beam, the height of the first beam is a distance between a side of the first beam away from the bottom plate and the bottom plate, and the height of the frame is a distance between a side of the frame away from the bottom plate and the bottom plate. The battery assembly is disposed at an accommodating portion between the frame and the first beam, and has a first end and provided with a first explosion-proof valve, and a second end provided with a second explosion-proof valve. A distance from the second explosion-proof valve to the bottom plate is greater than that from the first explosion-proof valve to the bottom plate.

11 Claims, 4 Drawing Sheets

(51) Int. Cl.
  *H01M 50/296*   (2021.01)
  *H01M 50/60*   (2021.01)

(52) U.S. Cl.
  CPC ...... *H01M 50/668* (2021.01); *H01M 2200/20* (2013.01); *H01M 2220/20* (2013.01)

(56) References Cited

U.S. PATENT DOCUMENTS

| | | | |
|---|---|---|---|
| 2018/0013124 A1* | 1/2018 | Balaster | H01M 50/553 |
| 2018/0047960 A1 | 2/2018 | Yokoshima et al. | |
| 2020/0212398 A1* | 7/2020 | You | H01M 50/30 |
| 2022/0059897 A1* | 2/2022 | Huang | H01M 50/244 |
| 2022/0348068 A1* | 11/2022 | Lee | H01M 10/625 |
| 2022/0352591 A1* | 11/2022 | Chi | H01M 50/258 |

FOREIGN PATENT DOCUMENTS

| | | |
|---|---|---|
| CN | 111613745 | 9/2020 |
| CN | 111900302 | 11/2020 |
| CN | 212366087 | 1/2021 |
| CN | 112531246 | 3/2021 |
| EP | 3675210 | 7/2020 |
| JP | 2000223102 | 8/2000 |

OTHER PUBLICATIONS

"Partial Search Report of Europe Counterpart Application", issued on Dec. 17, 2021, p. 1-p. 12.
"Office Action of China Counterpart Application", issued on Nov. 15, 2023, with English translation thereof, p. 1-p. 12.

* cited by examiner

BATTERY PACK AND VEHICLE

CROSS-REFERENCE TO RELATED APPLICATION

This application claims the priority of China patent application serial no. 202110528542.6, filed on May 14, 2021. The entirety of the above-mentioned patent application is hereby incorporated by reference herein and made a part of this specification.

BACKGROUND OF THE INVENTION

Field of the Invention

The disclosure relates to the technical field of batteries, and in particular, to a battery pack and a vehicle.

Description of Related Art

With the development and progress of technology, the application of the electric vehicle is becoming more and more extensive. A battery pack is disposed in the electric vehicle, and a plurality of batteries are disposed in the battery pack. During use, when some of the batteries in the plurality of batteries undergo thermal runaway, the internal pressure of the thermal runaway batteries is increased, causing the liquid inside the batteries to be ejected, and the liquid ejected from the thermal runaway batteries is sprayed to other batteries, thereby causing thermal runaway to spread.

It should be mentioned that, the information disclosed in the technical background section above is only used to enhance the understanding of the background of the disclosure, and therefore may include information that does not constitute the prior art known to those having ordinary skill in the art.

SUMMARY OF THE INVENTION

An object of the disclosure is to provide a battery pack and a vehicle.

According to an aspect of the disclosure, a battery pack is provided. The battery pack includes a bottom plate, a first beam, a frame, and a battery assembly. The frame and the first beam are opposite to each other and an accommodating portion is formed between the frame and the first beam. A height of the frame is greater than a height of the first beam. The height of the first beam is a distance between a side of the first beam away from the bottom plate and the bottom plate, and the height of the frame is a distance between a side of the frame away from the bottom plate and the bottom plate. The battery assembly comprises at least two batteries, and the battery assembly is disposed at the accommodating portion. A first end of at least one battery in the battery assembly is provided with a first explosion-proof valve, and a second end of at least one battery in the battery assembly is provided with a second explosion-proof valve. A distance from the second explosion-proof valve to the bottom plate is greater than a distance from the first explosion-proof valve to the bottom plate, the first end of the battery is an end of the battery opposite to the first beam, and the second end of the battery is an end of the battery opposite to the second beam.

According to another aspect of the disclosure, a vehicle is provided. The vehicle includes the abovementioned battery pack.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
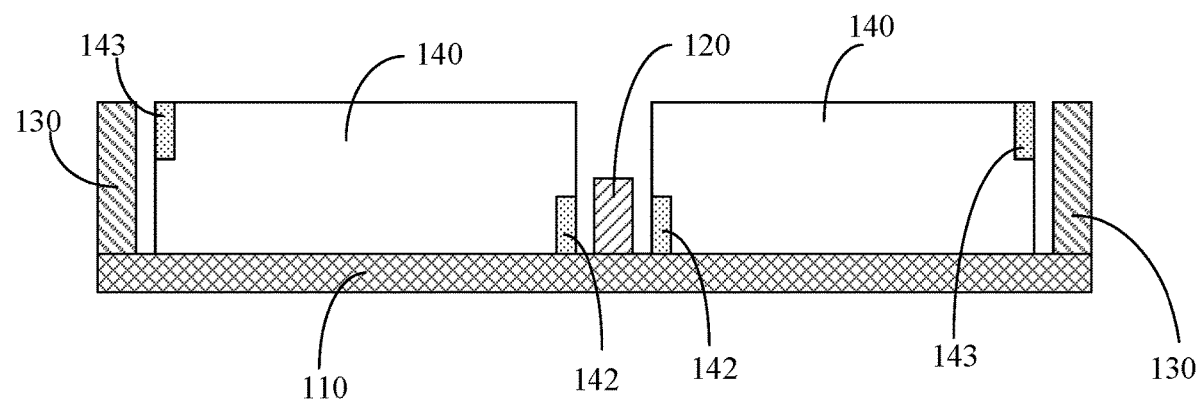
FIG. 1 is a schematic diagram of a first battery pack provided by an exemplary embodiment of the disclosure.
Figure 2:
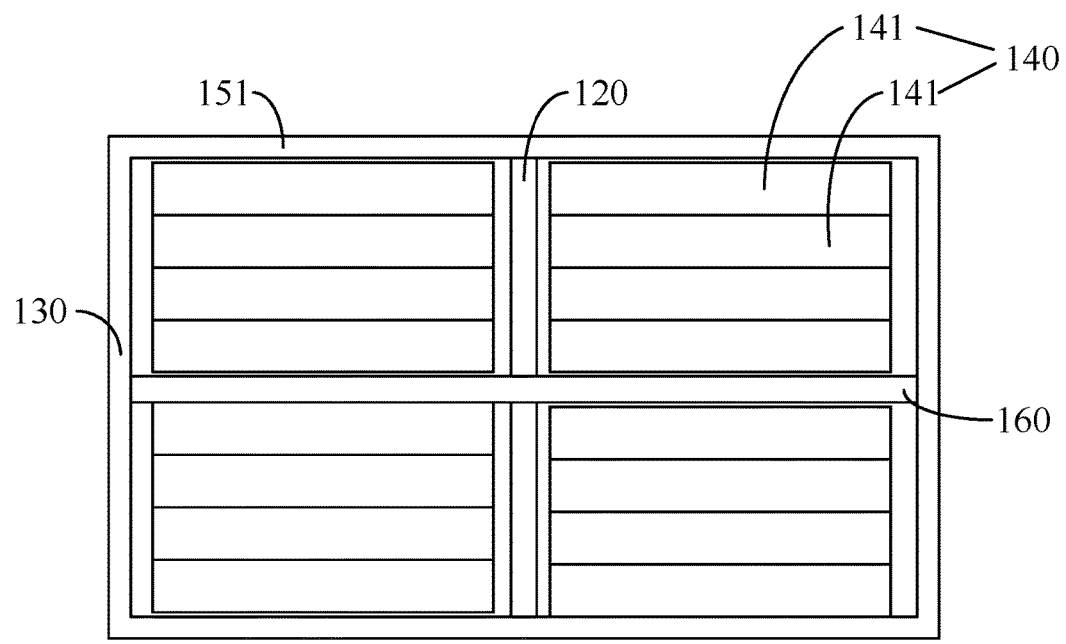
FIG. 2 is a schematic diagram of a second battery pack provided by an exemplary embodiment of the disclosure.

An exemplary embodiment of the disclosure provides a battery pack. As shown in FIG. 1 and FIG. 2, the battery pack includes a bottom plate 110, a first beam 120, a frame 130, and a battery assembly 140. The first beam 120 is disposed at the bottom plate 110. The frame 130 is disposed at the bottom plate 110. The frame 130 is opposite to the first beam 120, and an accommodating portion is formed between the frame 130 and the first beam 120. The height of the frame 130 is greater than the height of the first beam 120. The height of the first beam 120 is the distance between the side of the first beam 120 away from the bottom plate 110 and the bottom plate 110, and the height of the frame 130 is the distance between the side of the frame 130 away from the bottom plate 110 and the bottom plate 110. The battery assembly 140 includes at least two batteries 141, and the battery assembly 140 is disposed at the accommodating portion. The first end of at least one battery 141 in the battery assembly 140 is provided with a first explosion-proof valve 142, and the second end of at least one battery 141 in the battery assembly 140 is provided with a second explosion-proof valve 143. The distance between the second explosion-proof valve 143 and the bottom plate 110 is greater than the distance between the first explosion-proof valve 142 and the bottom plate 110. The first end of the battery 141 is the end of the battery 141 opposite to the first beam 120, and the second end of the battery 141 is the end of the battery 141 opposite to the frame 130.

In a battery pack provided by an embodiment of the disclosure, the height of the frame 130 is greater than the height of the first beam 120, and by disposing the first explosion-proof valve 142 at the first end of the at least one battery 141 in the battery assembly 140 opposite to the first beam 120, disposing the second explosion-proof valve 143 at the second end of the at least one battery 141 in the battery assembly 140 opposite to the frame 130, and making the distance between the second explosion-proof valve 143 and the bottom plate 110 greater than the distance between the first explosion-proof valve 142 and the bottom plate 110, when the first explosion-proof valve 142 disposed at the first end of the battery 141 is triggered, the liquid inside the battery 141 is sprayed to the first beam 120, and when the second explosion-proof valve 143 disposed at the second end of the battery 141 is triggered, the liquid inside the battery 141 is sprayed to the frame 130, such that the liquid in the battery 141 is prevented from being sprayed to other battery assemblies, thereby preventing thermal runaway spreading.

Hereinafter, each portion of the battery pack provided by an embodiment of the disclosure is described in detail as follows.

In an embodiment of the disclosure, the bottom plate 110 may be, but is not limited to, a flat plate structure or a flat plate-like structure. For example, the bottom plate 110 may be a stainless-steel plate, an aluminum alloy plate, etc. An accommodating area is disposed on the bottom plate 110, and the accommodating area is used to place the battery assembly 140. The orthographic projection of the battery assembly 140 on the bottom plate 110 is located in the accommodating area, and the battery assembly 140 may be directly placed in the accommodating area, or other devices may also be disposed between the battery assembly 140 and the bottom plate 110, such as cooling devices, etc., and the embodiments of the disclosure are not specifically limited in this regard.

A plurality of beams may be disposed on the bottom plate 110, and the plurality of beams may be internal beams. The frame 130 is used to form an accommodating space for accommodating the batteries 141, the internal beams are disposed in the accommodating space, and the internal beams divide the accommodating portion into a plurality of battery compartments. The batteries 141 or battery assembly 140 are respectively disposed in the battery compartments.

The accommodating area on the bottom plate 110 may be a rectangular structure, the frame 130 may include four frame beams 151, and the four frame beams 151 are connected end to end to form a frame. For example, the frame 130 may include a first frame beam, a second frame beam, a third frame beam and a fourth frame beam. The first frame beam, the second frame beam, the third frame beam and the fourth frame beam are connected end to end and form a frame by welding.

The internal beams may be disposed inside the frame, and the internal beams may include a first beam 120 and a second beam 160. As an example, the first beam 120 may be a cross beam, and the second beam 160 may be a longitudinal beam, and the first beam 120 and the second beam 160 are disposed to intersect. For example, the first beam 120 and the second beam 160 are arranged vertically.

In particular, the battery pack may include one first beam 120 and one second beam 160, the first beam 120 is parallel to the first frame, and the second beam 160 is parallel to the second frame. The first beam 120 and the second beam 160 divide the accommodating area into four accommodating portions, and the batteries 141 or the battery assembly 140 are respectively provided in the four accommodating portions. Of course, in practical applications, the number of the first beam 120 and the second beam 160 may also be a plurality, and the embodiments of the disclosure are not limited thereto.

The internal beams and the bottom plate 110 may be connected by welding, and the frame beams 151 and the bottom plate 110 may be connected by welding. The bottom surface of the internal beams is in contact with the top surface of the bottom plate 110. The bottom surface of the internal beams is a flat surface, and the top surface of the bottom plate 110 is a flat surface, thus fillet welding may be performed at two sides of the internal beams to connect the internal beams and the bottom plate 110. The bottom surface of the frame beams 151 is in contact with the top surface of the bottom plate 110. The bottom surface of the frame beams 151 is a flat surface, and the top surface of the bottom plate 110 is a flat surface, thus fillet welding may be performed on the inner and outer sides of the frame beams 151 to connect the frame beams 151 and the bottom plate 110.

Moreover, in order to improve the connection strength of the beams and the bottom plate 110, a connecting adhesive groove may be disposed on the bottom plate 110 and/or the beams, and a connecting adhesive layer may be disposed in the connecting adhesive groove to connect the bottom plate 110 and the beams.

The connecting adhesive groove may be disposed at the beams, or the connecting adhesive groove may be disposed at the bottom plate 110, or the connecting adhesive groove may be disposed on both the bottom plate 110 and the box beams. An adhesive injection channel may be disposed on the box beams or the bottom plate 110. The adhesive injection channel is used to communicate with the outside after the box beams and the bottom plate 110 are connected.

The adhesive injection channel is connected to the connecting adhesive groove. A connecting adhesive layer is disposed in the connecting adhesive groove to glue the bottom plate 110 to the box beams.

In an embodiment of the disclosure, the first beam 120 and the frame 130 may be two beams opposite to two ends in the length direction of the batteries 141. The first beam 120 is perpendicular to the length direction of the batteries 141. As an example, the extending direction of the first beam 120 is parallel to the arrangement direction of the batteries 141. The frame beams 151 are perpendicular to the length direction of the batteries 141. As an example, the extending direction of the frame beams 151 is parallel to the arrangement direction of the batteries 141. The first beam 120 is perpendicular to the length direction of the batteries 141. That is, the first beam 120 is opposite to the end surface of the batteries 141 in the length direction, and the extending direction of the tabs in the batteries is along the length direction. Therefore, the first anti-explosion valve 142 and the second anti-explosion valve 143 may be located on two sides of the tabs, thereby facilitating pressure relief of the batteries during thermal runaway.

The height of the frame 130 is greater than the height of the first beam 120, the height of the first beam 120 is the distance between the side of the first beam 120 away from the bottom plate 110 and the bottom plate 110, and the height of the frame 130 is the distance between the side of the frame 130 away from the bottom plate 110 and the bottom plate 110. For example, the height of the frame 130 may be 1.5 times, 2 times, 2.5 times, etc. the height of the first beam 120.

In practical applications, the heights of the plurality of frame beams 151 of the battery pack may be the same or different. In an embodiment of the disclosure, the first beam 120 is an internal beam located at one end of the length direction of the batteries 141, and the frame 130 is a frame beam 151 located at another end of the length direction of the batteries 141. The height of the frame beam 151 is greater than the height of the first beam 120, the height of the first beam 120 is the distance between the side of the first beam 120 away from the bottom plate 110 and the bottom plate 110, and the height of the frame beam 151 is the distance between the side of the frame beam 151 away from the bottom plate 110 and the bottom plate 110. For example, the height of the frame beam 151 may be 1.5 times, 2 times, 2.5 times, etc. the height of the first beam 120.

As an example, the orthographic projection of the first explosion-proof valve 142 on the first beam 120 is at least partially located on the first beam 120. The orthographic projection of the second explosion-proof valve 143 on the frame 130 is at least partially located on the frame 130. When thermal runaway occurs in the batteries 141, the liquid ejected from the first end is blocked by the first beam 120, and the liquid ejected from the second end of the batteries 141 is blocked by the frame 130, thereby reducing the liquid of the thermal runaway batteries 141 sprayed to other batteries 141 that causes thermal runaway to spread.

The orthographic projection of the first explosion-proof valve 142 on the first beam 120 is completely located on the first beam 120. The orthographic projection of the second explosion-proof valve 143 on the frame 130 is completely located on the frame 130. That is, the projection area of the first beam 120 on the first end of the batteries 141 covers the first explosion-proof valve 142, and the projection area of the frame 130 on the second end of the batteries 141 covers the second explosion-proof valve 143. This may ensure that when thermal runaway occurs in the batteries 141, the liquid sprayed from the first end is blocked by the first beam 120, and the liquid sprayed from the second end of the batteries 141 is blocked by the frame 130, thereby preventing the liquid ejected from the batteries 141 from being directly sprayed to other batteries 141 that causes thermal runaway to spread.

In an embodiment of the disclosure, the first beam 120 and the second beam 160 are disposed to intersect, such as disposed vertically. The second beam 160 is disposed in the accommodating space, and the second beam 160 and the first beam 120 are disposed perpendicularly. The height of the second beam 160 is greater than the height of the first beam 120. The second beam 160 is provided with an insertion groove on the side close to the bottom plate 110, and the first beam 120 is inserted into the insertion groove. The height of the first beam 120 is the distance between the side of the first beam 120 away from the bottom plate 110 and the bottom plate 110, and the height of the second beam 160 is the distance between the side of the second beam 160 away from the bottom plate 110 and the bottom plate 110.

The insertion groove is formed on the side of the second beam 160 close to the bottom plate 110, and the insertion groove penetrates the second beam 160 in a direction perpendicular to the length direction of the frame 130. The height of the insertion groove may be the same as the height of the first beam 120 or slightly greater than the height of the first beam 120. The first beam 120 penetrates the insertion groove, and a portion of the first beam 120 is engaged with the insertion groove.

Or, the insertion groove is formed on the side of the second beam 160 close to the bottom plate 110, and the insertion groove does not penetrate the second beam 160 in a direction perpendicular to the length direction of the frame 130. The height of the insertion groove may be the same as the height of the first beam 120 or slightly greater than the height of the first beam 120. The first beam 120 passes through the insertion groove. At this time, the insertion groove may be disposed at both sides of the second beam 160, and the first beam 120 may be disposed at both sides of the second beam 160, respectively. By inserting the first beam 120 to the second beam 160, the connection strength of the internal beams in the battery pack may be improved, thereby increasing the service life of the battery pack.

In an embodiment of the disclosure, a guiding portion may be further disposed on the bottom plate 110, and the guiding portion is used to guide the liquid ejected during the thermal runaway of the batteries 141 to the outside of the battery 141 box. For example, a guiding groove may be disposed on the bottom plate 110, and the liquid ejected from the batteries 141 is guided to the outside of the batteries 141 via the guiding groove.

Figure 6:
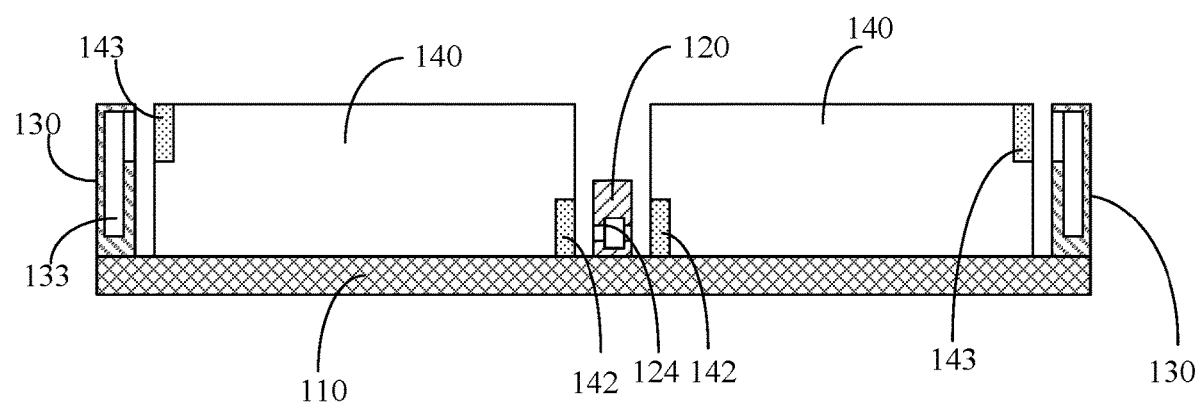
FIG. 6 is a schematic diagram of a third battery pack provided by an exemplary embodiment of the disclosure.

Or, as shown in FIG. 6, a first accommodating space 124 is disposed on the first beam 120, and the first accommodating space 124 is opposite to the first explosion-proof valve 142. The liquid ejected from the first explosion-proof valve 142 is accommodated by the first accommodating space 124, so as to prevent the liquid from flowing to other portions and causing thermal runaway to spread. A second accommodating space 133 is disposed on the frame 130, and the second accommodating space 133 is opposite to the second explosion-proof valve 142. The liquid ejected from the second explosion-proof valve 143 is accommodated by the second accommodating space 133, so as to prevent the liquid from flowing to other portions and causing thermal runaway to spread. For example, the first beam 120 and the frame 130 may be a hollow structure, and the first accommodating space 124 may include a cavity inside the first beam 120 and a through hole on the first beam 120 corresponding to the first explosion-proof valve 142. The second accommodating space 133 may include a cavity inside the frame 130 and a through hole on the frame 130 corresponding to the second explosion-proof valve 143.

It should be mentioned that, in an embodiment of the disclosure, the first accommodating space 124 may be disposed only on the first beam 120, or the second accommodating space 133 may be disposed only on the frame 130, or, at the same time, the first accommodating space 124 may be disposed on the first beam 120 and the second accommodating space 133 may be disposed on the frame 130, which is not specifically limited in the embodiments of the disclosure.

Figure 7:
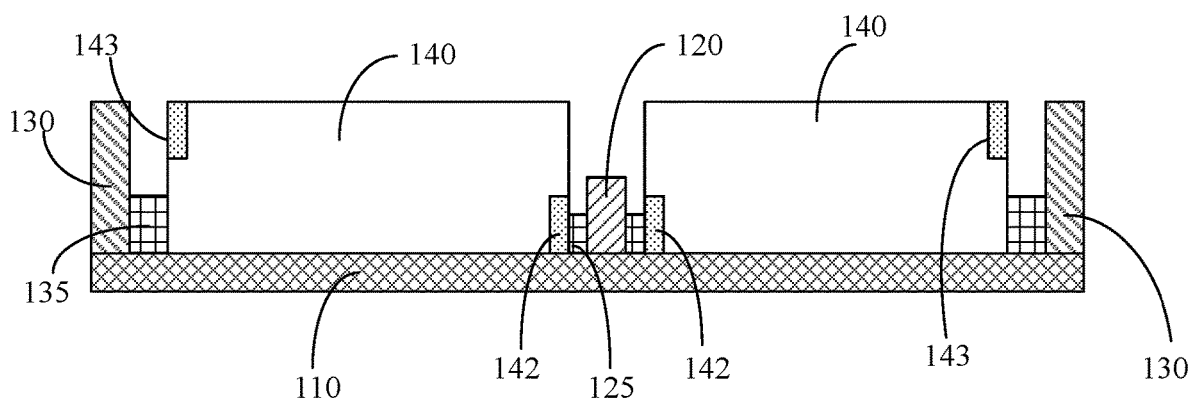
FIG. 7 is a schematic diagram of a fourth battery pack provided by an exemplary embodiment of the disclosure.

Or, as shown in FIG. 7, the battery pack provided by an embodiment of the disclosure may further include a first liquid-collecting device 125 and a second liquid-collecting device 135, and the first liquid-collecting device 125 is disposed between the first explosion-proof valve 142 and the first beam 120. The second liquid-collecting device 135 is disposed between the second explosion-proof valve 143 and the frame 130. The liquid ejected from the first explosion-proof valve 142 is absorbed by the first liquid-collecting device 125, so as to prevent the liquid from flowing to other portions and causing thermal runaway to spread. The liquid ejected from the second explosion-proof valve 143 is absorbed by the second liquid-collecting device 135, so as to prevent the liquid from flowing to other portions and causing thermal runaway to spread. For example, the first liquid-collecting device 125 may be a liquid-collecting device having a sponge, and the liquid is absorbed by the sponge. The second liquid-collecting device 135 may be a liquid-collecting device having a sponge, and the liquid is absorbed by the sponge.

It should be mentioned that, in an embodiment of the invention, the first liquid-collecting device 125 may be disposed only between the first explosion-proof valve 142 and the first beam 120, or the second liquid-collecting device 135 may be disposed only between the second explosion-proof valve 143 and the frame 130, or, at the same time, the first liquid-collecting device 125 may be disposed between the first explosion-proof valve 142 and the first beam 120, and the second liquid-collecting device 135 may be disposed between the second explosion-proof valve 143 and the frame 130. The embodiments of the disclosure are not specifically limited in this regard.

In an embodiment of the disclosure, one or two explosion-proof valves may be disposed on the batteries 141. When each of the batteries 141 is provided with one explosion-proof valve, the explosion-proof valves of some of the batteries in the plurality of batteries in the battery assembly 140 are close to the first beam 120, and the explosion-proof valves of some of the batteries are close to the frame 130. The first explosion-proof valve 142 is close to the first beam 120, the explosion-proof valve close to the frame 130 is the second explosion-proof valve 143, and the position of the second explosion-proof valve 143 is higher than the position of the first explosion-proof valve 142.

Figure 3:
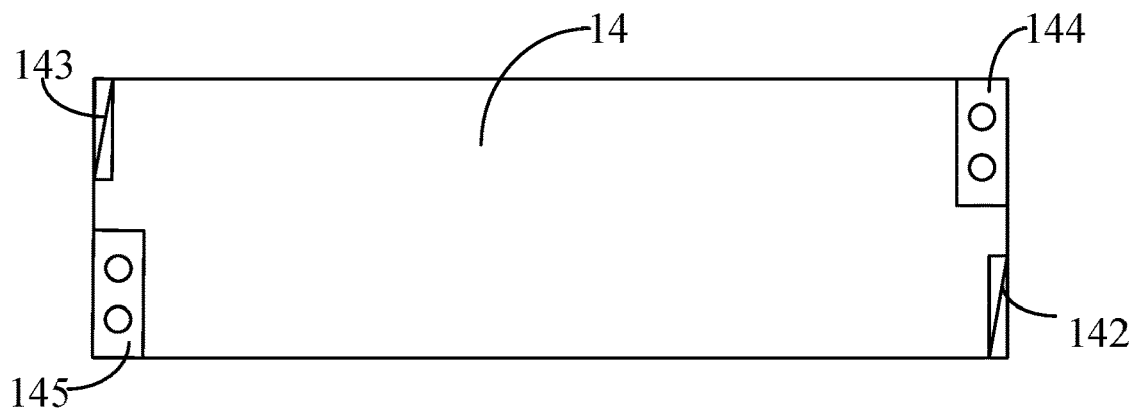
FIG. 3 is a schematic diagram of a first battery provided by an exemplary embodiment of the disclosure.
Figure 4:
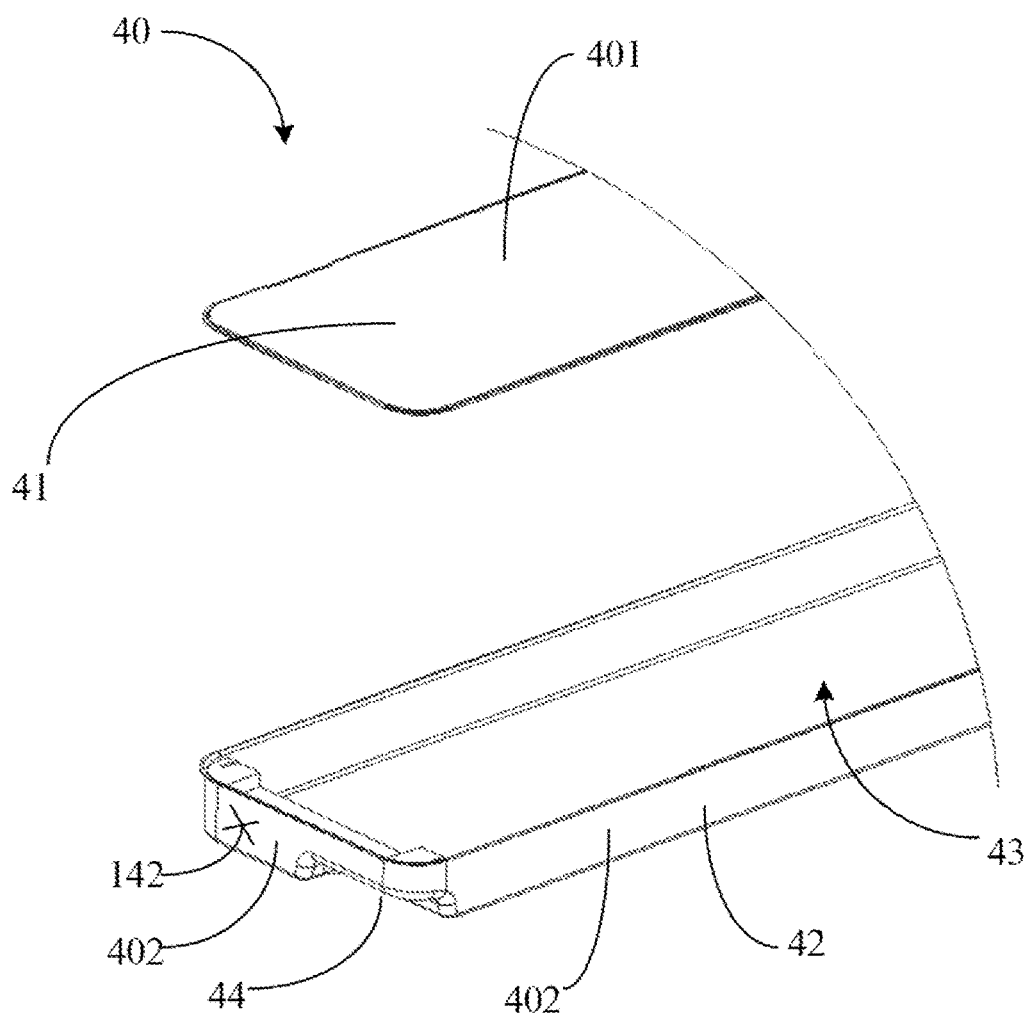
FIG. 4 is a schematic diagram of a battery casing provided by an exemplary embodiment of the disclosure.
Figure 5:
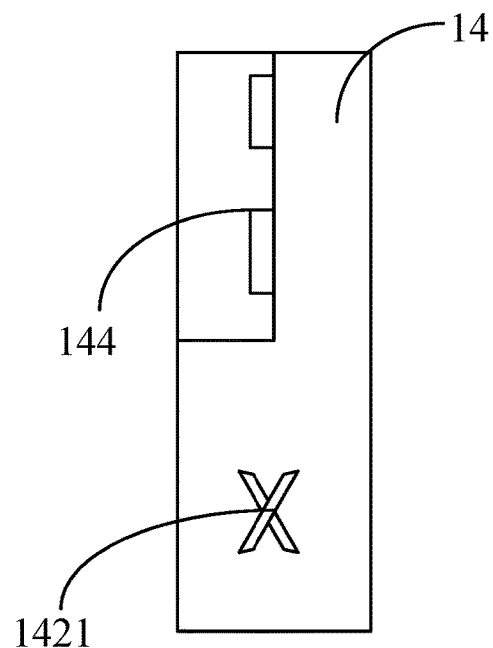
FIG. 5 is a schematic diagram of another battery provided by an exemplary embodiment of the disclosure.

When a battery 141 has two explosion-proof valves, as shown in FIG. 3 and FIG. 4, the battery 141 includes a battery body 14, and the battery body 14 includes two opposite first surfaces 401 and four second surfaces 402 disposed around the first surfaces 401. The area of the first surfaces 401 is greater than the area of the second surfaces 402. The first explosion-proof valve 142 is disposed at the first end surface of the battery body 14, and the first explosion-proof valve 142 is disposed at an end of the first end surface of the battery body 14 close to the bottom plate 110. The first end surface of the battery body 14 is the second surface of the battery body 14 opposite to the first beam 120. The second explosion-proof valve 143 is disposed at the second end surface of the battery body 14, and the second explosion-proof valve 143 is disposed at an end of the second end surface of the battery body 14 away from the bottom plate 110. The second end surface of the battery body 14 is the second surface of the battery body 14 opposite to the frame 130.

The first explosion-proof valve 142 and the second explosion-proof valve 143 are diagonally disposed at the first end surface and the second end surface of the battery body. On one hand, the ejected liquid may be blocked by the first beam 120 and the frame 130 after thermal runaway, so as to prevent the thermal runaway from spreading. On the other hand, two explosion-proof valves are respectively disposed at two end surfaces of the battery body, such that the explosion-proof valves are located in the extending direction of the tabs, which is beneficial to the pressure relief of the battery after thermal runaway.

In an embodiment of the disclosure, each of the batteries 141 may further include a first terminal assembly 144 and a second terminal assembly 145. The first terminal assembly 144 is disposed at an end of the first surface close to the first end surface, and the distance between the first terminal assembly 144 and the bottom plate 110 is greater than the distance between the first explosion-proof valve 142 and the bottom plate 110. The second terminal assembly 145 is disposed at an end of the first surface close to the second end surface, and the distance between the second terminal assembly 145 and the bottom plate 110 is greater than the distance between the first explosion-proof valve 142 and the bottom plate 110. That is, on the battery body 14, the first terminal assembly 144 and the second terminal assembly 145 may be diagonally disposed, and the first terminal assembly 144 and the second terminal assembly 145 disposed diagonally allow the stacked batteries 141 to be connected in series or in parallel. On this basis, the first explosion-proof valve 142 and the second explosion-proof valve 143 are diagonally disposed to avoid the first terminal assembly 144 and the second terminal assembly 145 in the structure.

Figure 8:
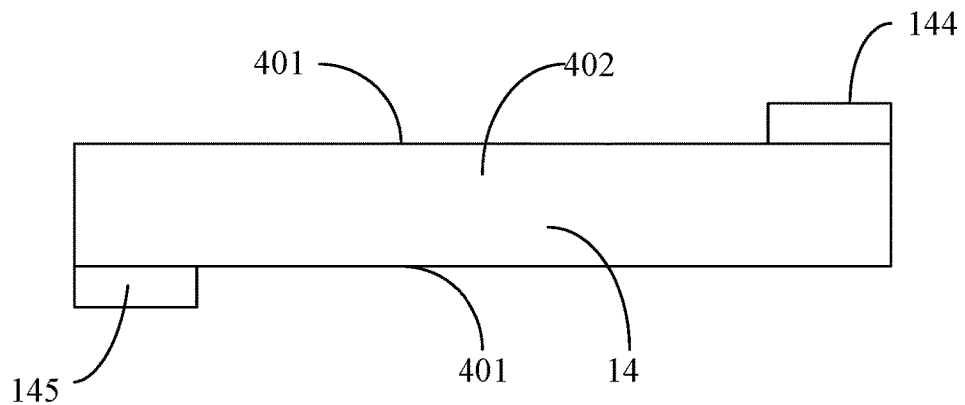
FIG. 8 is a schematic diagram of a second battery provided by an exemplary embodiment of the disclosure.
Figure 9:
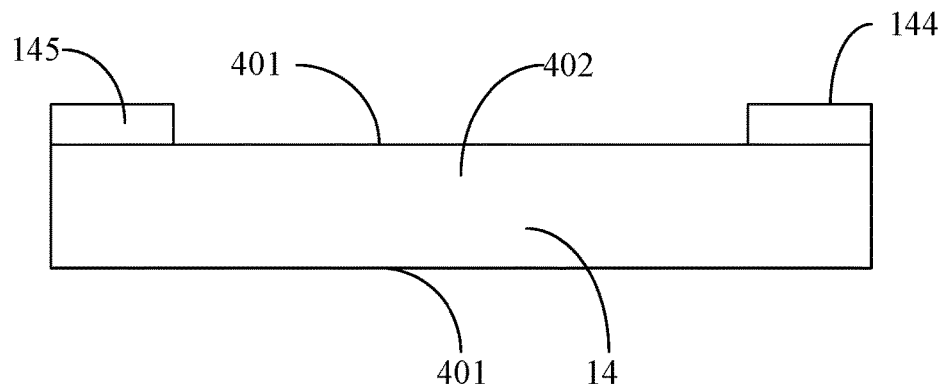
FIG. 9 is a schematic diagram of a third battery provided by an exemplary embodiment of the disclosure.

In particular, as shown in FIG. 8, the battery body 14 includes two opposite first surfaces 401, and the first terminal assembly 144 and the second terminal assembly 145 are respectively disposed at a first surface 401. Or, as shown in FIG. 9, the first terminal assembly 144 and the second terminal assembly 145 may be disposed at the same first surface 401.

The first terminal assembly 144 and the second terminal assembly 145 are diagonally disposed, such that the first explosion-proof valve 142 and the second explosion-proof valve 143 may be diagonally disposed. In addition, the terminal assemblies may not be dislocated after the batteries are reversed, such that the batteries may be used for parallel battery assemblies or serial battery assemblies, thus increasing the versatility of the batteries.

In particular, a first recess 44 and a second recess (not shown in the figures) may be disposed on the battery body 14. The first recess 44 is used to mount the first terminal assembly 144, and the second recess is used to mount the second terminal assembly 145. The first recess 44 is disposed at an end of the first surface close to the first end surface, and the distance between the first recess 44 and the bottom plate 110 is greater than the distance between the first explosion-proof valve 142 and the bottom plate 110. The second recess is disposed at an end of the first surface close to the second end surface, and the distance between the second recess and the bottom plate 110 is greater than the distance between the first explosion-proof valve 142 and the bottom plate 110.

The battery body 14 has two first surfaces 401, and the first recess 44 and the second recess may be disposed at the same first surface. For example, the first recess 44 and the second recess may be disposed at the upper first surface or the lower first surface of the battery body 14. It should be noted that "upper" and "lower" here are only used to distinguish the two first surfaces 401 of the battery body 14 and do not represent the upper and lower positional relationship of the two first surfaces.

When the first recess 44 and the second recess are disposed at the upper first surface, a protruding third terminal assembly and fourth terminal assembly may be disposed on the lower first surface. The third terminal assembly and the fourth terminal assembly are used in conjunction with the first recess 44 and the second recess of the adjacent battery 141.

In a feasible embodiment of the disclosure, the first end surface of the battery body 14 may include an upper area portion and a lower area portion, the lower area portion is close to the bottom plate 110, and the upper area portion is away from the bottom plate 110. The first recess 44 may be disposed in the upper area portion, and the first explosion-proof valve 142 may be disposed in the lower area portion. The areas of the upper area portion and the lower area portion may be equal. The second end surface of the battery body 14 may include an upper area portion and a lower area portion, the lower area portion is close to the bottom plate 110, and the upper area portion is away from the bottom plate 110. The second recess may be disposed in the lower area portion, and the second explosion-proof valve 143 may be disposed in the upper area portion. The areas of the upper area portion and the lower area portion may be equal.

The battery body 14 may include a battery cell and a casing. The battery cell is connected to the first terminal assembly 144 and the second terminal assembly 145. The battery cell is located in the casing. The first recess 44 and the second recess are disposed on the casing. That is, the first terminal assembly 144 and the second terminal assembly 145 are mounted on the casing, which is not only convenient for mounting, but also relatively simple in structure, and the casing may be used to mount the terminal assemblies.

Or, on the basis that the first terminal assembly 144 and the second terminal assembly 145 are connected to the battery cell, the first recess 44 and the second recess may be disposed on a structure outside the casing to adapt to the mounting positions of the first terminal assembly 144 and the second terminal assembly 145.

In an embodiment of the disclosure, the first terminal assembly 144 may be a positive terminal assembly, and the second terminal assembly 145 may be a negative terminal assembly. Or, the first terminal assembly 144 may be a negative terminal assembly, and the second terminal assembly 145 may be a positive terminal assembly, and the embodiments of the disclosure are not specifically limited in this regard.

The material of the casing may be stainless steel or aluminum and has good corrosion resistance and sufficient strength.

In an embodiment, the casing includes a first area portion, a second area portion, and a third area portion arranged in sequence, the first recess 44 is disposed in the first area portion, and the second recess is disposed in the second area portion. The thicknesses of the first area portion and the third area portion are consistent with the thickness of at least a portion of the second area portion. That is, after the first recess 44 and the second recess are formed on the casing, there is no need to perform special thinning treatment on the casing, so as to avoid adding processing steps.

In an embodiment, the thickness of the casing is uniform, which not only results in stronger structural stability, but also facilitates processing.

The casing 40 includes a first casing section 41 and a second casing section 42. The second casing section 42 is connected to the first casing section 41 to seal the battery cell. In particular, the first recess 44 and the second recess are disposed on the first casing section 41 or the second casing section 42. The first casing section 41 and the second casing section 42 are disposed separately to facilitate the mounting of the battery cell, and the processing is also more convenient.

Optionally, both the first casing section 41 and the second casing section 42 may be formed with accommodating cavities 43. After the first casing section 41 and the second casing section 42 are docked, the battery cell is located in the cavity formed by two accommodating cavities 43. In particular, the depths of the accommodating cavities 43 of the first casing section 41 and the second casing section 42 may be the same or different, which is not limited here.

Optionally, the first casing section 41 is a flat plate, and the second casing section 42 is formed with the accommodating cavity 43. As shown in FIG. 2, the battery cell is located in the accommodating cavity 43. The arrangement of the flat plate may facilitate subsequent connections and is less difficult to process.

Further, the peripheral edge of the second casing section 42 is provided with a flange, and the first casing section 41 is welded to the flange, so as to ensure the reliable welding of the first casing section 41 and the second casing section 42 and provide the stability of the connection. The configuration of the flange is mainly to ensure that the welding area is increased, thereby improving the stability of the welding.

Optionally, when the first casing section 41 has the accommodating cavity 43, the circumferential edge of the first casing section 41 may also be provided with a flange. As shown in FIG. 2, the flange of the first casing section 41 is welded to a flange of the second casing section 42.

It should be mentioned that, the flange may be understood as a flange edge, such as one flange edge formed by extending outward toward the outer edge from the periphery of a flat plate, or one flange edge formed at the sidewall of one structure having the accommodating cavity 43 extended outward, and the flange edge at this time is substantially perpendicular to the sidewall. The flanges disposed on the peripheral edges of the first casing section 41 and the second casing section 42 mentioned in the above embodiment may be as described herein. In this way, the flange of the first casing section 41 and the flange of the second casing section 42 may directly face each other, thereby facilitating connection.

In an embodiment, the battery cell includes a battery cell body and tabs, and the tabs are extended from the length direction of the battery cell body. The tabs are connected to the terminal assemblies. At this time, the terminal assemblies may be disposed at the end of the battery body 14 to facilitate connection, and the length space of the batteries 141 may be sufficiently utilized. In particular, the tabs and the terminal assemblies may be directly connected. That is, the tabs and the terminal assemblies may be directly welded, or the tabs and the terminal assemblies may be connected via a metal adapter. The specific connection method may be welding, or the use of riveting, etc., which is not limited here.

It should be mentioned that, the main body of the battery cell includes two or more electrodes, and the tabs include two or more single tabs. The single tabs are respectively extended from the corresponding electrodes. The width of the single tabs is less than the width of the electrodes. A plurality of single tabs are stacked to form tabs and be connected to the terminal assemblies. The tabs may be welded with the terminal assemblies. In particular, the single tabs are made of metal foil having good electrical and thermal conductivity, such as aluminum, copper, nickel, etc.

For example, the main body of the battery cell may include a first tab and a second tab. The first tab is connected to the first terminal assembly 144, and the second tab is connected to the second terminal assembly 145. For example, the first terminal assembly 144 is a positive terminal assembly, the second terminal assembly 145 is a negative terminal assembly, the first tab is a positive tab, and the second tab is a negative tab. The positive terminal assembly is connected to the positive tab, and the negative terminal assembly is connected to the negative tab.

It should be mentioned that, the terminal assemblies and the casing are insulated from each other. For example, an insulating member may be used for insulation between the two, or an insulating coating may be used for insulation, which is not limited here, and selection may be made according to actual needs.

In a feasible embodiment of the disclosure, a first thinned area 1421 is disposed on the first end surface of the batteries 141, and the first thinned area 1421 forms the first explosion-proof valve 142. A second thinned area (not shown in the figures) is disposed on the second end surface of the batteries 141, and the second thinned area forms the second explosion-proof valve 143.

In particular, the first thinned area 1421 is disposed at the first end surface of the battery body 14, and the first thinned area 1421 is disposed at an end of the first end surface of the battery body 14 close to the bottom plate 110. The first end surface of the battery body 14 is the second surface of the battery body 14 opposite to the first beam 120. The second thinned area is disposed at the second end surface of the battery body 14, and the second thinned area is disposed at an end of the second end surface of the battery body 14 away from the bottom plate 110. The second end surface of the battery body 14 is the second surface of the battery body 14 opposite to the frame 130.

The first thinned area 1421 may be implemented by disposing a notch on the first end surface of the battery body 14, and the depth of the notch may be a portion of the thickness of the casing. The first thinned area 1421 may include a first straight line notch and a second straight line notch, and the first straight line notch and the second straight line notch are intersected. That is, the first thinned area 1421 may be an X-shaped notch. Of course, in practical applications, the first thinned area 1421 may also be a C-shaped, H-shaped, etc. notch, or the first thinned area 1421 may also be a circular, elliptical, triangular, annular, etc. notch. The embodiments of the disclosure are not specifically limited in this regard.

The second thinned area may be implemented by disposing a notch on the first end surface of the battery body 14, and the depth of the notch may be a portion of the thickness of the casing. The second thinned area may include a first straight line notch and a second straight line notch, and the first straight line notch and the second straight line notch are intersected. That is, the second thinned area may be an X-shaped notch. Of course, in practical applications, the second thinned area may also be a C-shaped, H-shaped, etc. notch, or the second thinned area may also be a circular, elliptical, triangular, annular, etc. notch. The embodiments of the disclosure are not specifically limited in this regard.

Alternatively, mounting holes may also be disposed at corresponding positions on the first end surface and the second end surface of the battery body 14, and the explosion-proof valves are mounted in the mounting holes. For example, a first mounting hole is disposed at the first end surface, and the first explosion-proof valve 142 is disposed at the first mounting hole. A second mounting hole is disposed at the second end surface, and the second explosion-proof valve 143 is disposed at the second mounting hole. The first mounting hole is disposed at the first end surface of the battery body 14, and the first mounting hole is disposed at an end of the first end surface of the battery body 14 close to the bottom plate 110. The second mounting hole is disposed at the second end surface of the battery body 14, and the second mounting hole is disposed at an end of the second end surface of the battery body 14 away from the bottom plate 110.

In an embodiment of the disclosure, one or a plurality of batteries 141 may be disposed between the accommodating portion formed by the first beam 120 and the frame 130. When the batteries 141 are disposed in the accommodating portion, the casing of the batteries 141 is directly in contact with the structure in the battery 141 box. For example, the sides of the batteries 141 are in contact with the internal beams and the frame beam 151 respectively. The bottom surface of the batteries 141 is in contact with the top surface of the bottom plate 110. By directly contacting the battery 141 casing and the box body, members such as the battery 141 module casing are omitted in the box body, thus increasing the number of the batteries 141 in the box body, thereby increasing the energy density of the battery pack.

A vehicle provided by an embodiment of the disclosure includes a battery pack. The height of the frame 130 is greater than the height of the first beam 120. By disposing the first explosion-proof valve 142 at the first end of the batteries 141 opposite to the first beam 120, and disposing a second explosion-proof valve 143 at the second end of the batteries 141 opposite to the frame 130, and making the distance between the second explosion-proof valve 143 and the bottom plate 110 greater than the distance between the first explosion-proof valve 142 and the bottom plate 110, when the first explosion-proof valve 142 disposed at the first end of the batteries 141 is triggered, the liquid inside the batteries 141 is sprayed to the first beam 120, and when the second explosion-proof valve 143 disposed at the second end of the batteries 141 is triggered, the liquid inside the batteries 141 is sprayed to the frame 130, so as to prevent the liquid in the batteries 141 from being sprayed to other batteries 141, and prevent thermal runaway spreading.

Exemplary embodiments of the disclosure also provide a vehicle. The vehicle includes the above battery pack, and the battery pack is used to provide electric energy to the vehicle.

In particular, the battery pack includes the bottom plate 110, the first beam 120, the frame 130 and the battery assembly 140. The first beam 120 is disposed at the bottom plate 110. The frame 130 is disposed at the bottom plate 110, the frame 130 is opposite to the first beam 120, and an accommodating portion is formed between the frame 130 and the first beam 120. The height of the frame 130 is greater than the height of the first beam 120, the height of the first beam 120 is the distance between the side of the first beam 120 away from the bottom plate 110 and the bottom plate 110, and the height of the frame 130 is the distance between the side of the frame 130 away from the bottom plate 110 and the bottom plate 110. The battery assembly 140 includes at least two batteries 141, and the battery assembly 140 is disposed at the accommodating portion. The first end of at least one battery 141 in the battery assembly 140 is provided with the first explosion-proof valve 142, and the second end of at least one battery 141 in the battery assembly 140 is provided with the second explosion-proof valve 143. The distance between the second explosion-proof valve 143 and the bottom plate 110 is greater than the distance between the first explosion-proof valve 142 and the bottom plate 110, the first end of the battery 141 is the end of the battery 141 opposite to the first beam 120, and the second end of the battery 141 is the end of the battery 141 opposite to the frame 130.

A vehicle provided by an embodiment of the disclosure includes a battery pack. The height of the frame 130 in the battery pack is greater than the height of the first beam 120. By disposing the first explosion-proof valve 142 at the first end of the at least one battery 141 in the battery assembly 140 opposite to the first beam 120, disposing the second explosion-proof valve 143 at the second end of the at least one battery 141 in the battery assembly 140 opposite to the frame 130, and making the distance between the second explosion-proof valve 143 and the bottom plate 110 greater than the distance between the first explosion-proof valve 142 and the bottom plate 110, when the first explosion-proof valve 142 disposed at the first end of the battery 141 is triggered, the liquid inside the battery 141 is sprayed to the first beam 120, and when the second explosion-proof valve 143 disposed at the second end of the battery 141 is triggered, the liquid inside the battery 141 is sprayed to the frame 130, preventing the liquid in the battery 141 from being sprayed to other battery assemblies, and preventing thermal runaway spreading.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery pack, comprising:
    a bottom plate;
    a first beam;
    a frame, wherein an accommodating portion is formed between the frame and the first beam, a height of the frame is greater than a height of the first beam, the height of the first beam is a distance between a side of the first beam away from the bottom plate and the bottom plate, and the height of the frame is a distance between a side of the frame away from the bottom plate and the bottom plate; and
    a battery assembly, wherein the battery assembly comprises at least two batteries, the battery assembly is disposed at the accommodating portion, a first end of at least one of the batteries in the battery assembly is provided with a first explosion-proof valve, a second end of at least one of the batteries in the battery assembly is provided with a second explosion-proof valve, a distance from the second explosion-proof valve to the bottom plate is greater than a distance from the first explosion-proof valve to the bottom plate, the first end of the battery is an end of the battery opposite to the first beam, and the second end of the battery is an end of the battery opposite to the frame,
    wherein the first end of each of the batteries is provided with the first explosion-proof valve, the second end of each of the batteries is provided with the second explosion-proof valve, the distance from the second explosion-proof valve to the bottom plate is greater than the distance from the first explosion-proof valve to the bottom plate, the first end of the battery is the end of the battery opposite to the first beam, and the second end of the battery is the end of the battery opposite to the frame,
    wherein the frame comprises four frame beams, the four frame beams are connected end to end, the frame surrounds and connects to an outermost peripheral edge of the bottom plate, and the first beam is surrounded by the four frame beams,
    wherein an orthographic projection of the first explosion-proof valve on the first beam is completely located on the first beam, and an orthographic projection of the second explosion-proof valve on the frame is completely located on the frame,
    wherein each of the batteries comprises:
    a battery body, wherein the battery body comprises two opposite first surfaces and four second surfaces disposed around the first surfaces, and an area of the first surfaces is greater than an area of the second surfaces;
    the first explosion-proof valve is disposed at a first end surface of the battery body, and the first explosion-proof valve is disposed at an end of the first end surface of the battery body close to the bottom plate, the first end surface of the battery body is the second surface of the battery body opposite to the first beam, the second explosion-proof valve is disposed at a second end surface of the battery body, and the second explosion-proof valve is disposed at an end of the second end surface of the battery body away from the bottom plate, and the second end surface of the battery body is the second surface of the battery body opposite to the frame,
    wherein only one first explosion-proof valve is disposed at the first end surface of the battery body, and only one second explosion-proof valve is disposed at the second end surface of the battery body.

2. The battery pack of claim 1, wherein an extending direction of the first beam is perpendicular to a length direction of the batteries.

3. The battery pack of claim 2, further comprising:
    a second beam, wherein the second beam is disposed at the bottom plate, and the second beam and the first beam are disposed perpendicularly, a height of the second beam is greater than the height of the first beam, a side of the second beam close to the bottom plate is provided with an insertion groove, the first beam penetrates the insertion groove and a portion of the first beam is engaged with the insertion groove, the height of the first beam is the distance between the side of the first beam away from the bottom plate and the bottom plate, and the height of the second beam is a distance between a side of the second beam away from the bottom plate and the bottom plate.

4. The battery pack of claim 1, wherein each of the batteries further comprises:
a first terminal assembly, wherein the first terminal assembly is disposed at an end of the first surface close to the first end surface, and a distance between the first terminal assembly and the bottom plate is greater than the distance between the first explosion-proof valve and the bottom plate;
a second terminal assembly, wherein the second terminal assembly is disposed at an end of the first surface close to the second end surface, and a distance between the second terminal assembly and the bottom plate is less than the distance between the second explosion-proof valve and the bottom plate.

5. The battery pack of claim 1, wherein a first thinned area is disposed on a first end surface of the battery, the first thinned area forms the first explosion-proof valve, a second thinned area is disposed on a second end surface of the battery, and the second thinned area forms the second explosion-proof valve.

6. The battery pack of claim 2, wherein a first thinned area is disposed on a first end surface of the battery, the first thinned area forms the first explosion-proof valve, a second thinned area is disposed on a second end surface of the battery, and the second thinned area forms the second explosion-proof valve.

7. The battery pack of claim 1, wherein a first accommodating space is disposed on the first beam, and the first accommodating space is opposite to the first explosion-proof valve; and/or,
a second accommodating space is disposed on the frame, and the second accommodating space is opposite to the second explosion-proof valve.

8. The battery pack of claim 2, wherein a first accommodating space is disposed on the first beam, and the first accommodating space is opposite to the first explosion-proof valve; and/or,
a second accommodating space is disposed on the frame, and the second accommodating space is opposite to the second explosion-proof valve.

9. The battery pack of claim 1, further comprising:
a first liquid-collecting device, wherein the first liquid-collecting device is disposed between the first explosion-proof valve and the first beam; and/or,
a second liquid-collecting device, wherein the second liquid-collecting device is disposed between the second explosion-proof valve and the frame.

10. The battery pack of claim 2, further comprising:
a first liquid-collecting device, wherein the first liquid-collecting device is disposed between the first explosion-proof valve and the first beam; and/or,
a second liquid-collecting device, wherein the second liquid-collecting device is disposed between the second explosion-proof valve and the frame.

11. A vehicle, comprising the battery pack of claim 1.

* * * * *